Dec. 20, 1949     C. SAURER     2,491,909
PICKER BUMPER FOR LOOMS
Filed April 9, 1946
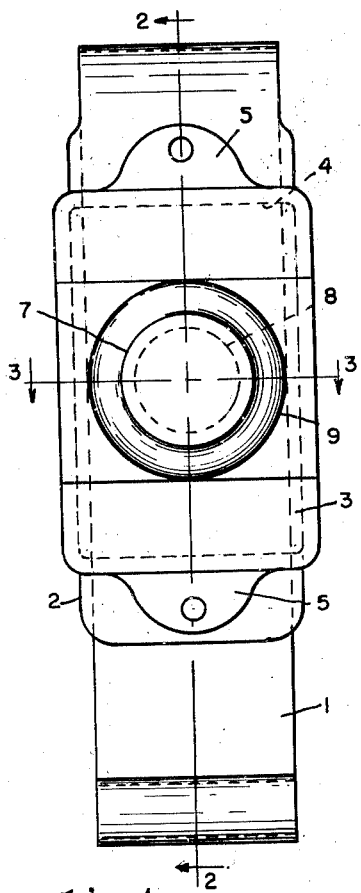
INVENTOR.
CURT SAURER
BY
Oberlin & Limbach
ATTORNEYS Patented Dec. 20, 1949

2,491,909

UNITED STATES PATENT OFFICE 2,491,909

PICKER BUMPER FOR LOOMS

Curt Saurer, Detroit, Mich., assignor to The Ohio Rubber Company, Willoughby, Ohio, a corporation of Ohio Application April 9, 1946, Serial No. 660,803

7 Claims. (Cl. 139—166)

In a loom, as is well understood, the picking motion actuates a picker stick which on its upper end is connected to a picker. The latter is slidably supported on a rod parallel to the shuttle box and when actuated serves in turn to throw the shuttle across the loom. In order to stop the shuttle following its entry into the shuttle box a device known as a picker bumper is employed, and it is to an improved construction of such bumper that the present invention relates.

As heretofore constructed such picker bumper has always been of complicated construction, embodying a number of elements which under the severe impact to which the device is subjected tend to come loose and be noisy. Accordingly, one principal object of the present invention is to provide a bumper for the stated purpose which will be extremely simple in construction, comprising a minimum number of parts and including a readily replaceable element in that part of the device which is subject to the severest wear. A further object is to provide such a bumper which will gradually absorb the shock resulting from impact of the shuttle so that the resulting strains will diminish gradually and so that no chafing of the picker contact area or of the attaching surface of the device will occur.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a front elevational view of a picker bumper embodying my present improvements;

Fig. 2 is a central vertical section therethrough as indicated by the line 2—2 on Fig. 1;

Fig. 3 is a similar transverse section, the plane of the section being indicated by the lines 3—3 on Figs. 1 and 2; and Fig. 4 is a sectional view of a detail taken on the same plane as Fig. 2 but showing the parts involved as they appear in a stage preliminary to their final assembly.

A bumper of the type in question is desirably designed so as to be removable from the end of the shuttle box to which it is normally attached when the loom is in operation. Accordingly to facilitate such mounting of the present device, an attaching support in the form of a spring clip 1 is desirably utilized, such clip being formed so as to fit over the end of the shuttle box and support the bumper proper in alignment with the shuttle when it is received in the box. At the same time, as will presently appear, the face 2 of said clip to which the bumper is attached also directly cooperates in the functioning of the latter.

The members whereof the bumper proper is formed are composed of compressible resilient material such as rubber vulcanized to the proper degree, it being understood that by the latter term it is intended to connote not only natural rubber but also neoprene or other synthetic rubber or rubber substitutes which are now available and have the necessary resilience and durability.

The main member 3 of the bumper, which will be thus molded of rubber or equivalent material, will be of general rectangular shape viewed in elevation as in Fig. 1 and will desirably have at least two opposite sloping side walls, as shown in Fig. 2, whereby a corresponding cavity is formed in the larger face thereof, viz. that which is opposed to face 2 of clip 1. The other pair of opposed side walls may be straight, as shown in Fig. 3. Encircling said member adjacent its larger face is a metallic or equivalent rigid band 4 which at opposite ends is formed with extensions 5 that are adapted to be fixedly attached to the corresponding portion of clip 1 by means of rivets or the like. The member 3, it will be understood, is vulcanized to the band 4 and, as shown in Fig. 4, is initially provided with a bead 6 which projects slightly beyond the corresponding edge of said band. However, when the latter is secured in the manner described to the clip, this bead will be compressed and thus form a tight closure between member 3 and face 2 of the supporting clip whereby the cavity within said member is substantially sealed off.

The second member 7 of the device is composed of similar material to that of the first and is designed to be detachably secured to the smaller outer face of the latter and when thus in place to project centrally from such face. However, this second member is not hollow but solid in cross section and its general form is that of an hour-glass, i. e. the side wall 8 thereof is concave, as clearly shown in Figs. 2 and 3. The base of this second member is vulcanized to a circular plate 9 of metal or equivalent rigid material which carries, centrally projecting therefrom, a headed stud 10. The opposed smaller face of member 3 to which member 7 is attached is formed with a central opening 11 adapted to snugly fit about such headed stud and thus normally to secure the members in proper relation. However, owing to the compressibility of the material of which member 3 is composed, it is possible manually to insert or remove the stud as occasion may require. Plate 9 is also formed with a peripheral flange 12 that projects in the same direction as said stud and is adapted to closely encircle a portion of the first member adjacent the smaller face thereof.

From the foregoing description it will be seen that when the two members of resilient compressible material are assembled together and the supporting clip 1 properly secured to the end of the shuttle box, the second replaceable solid member 7 will be disposed to directly receive the impact transmitted from the shuttle. Owing to its shape the shock of such impact will be absorbed gradually, most of the strains being carried to the center of the device and diminishing gradually toward both ends so that no chafing on the picker contacting end or on the opposite end which is vulcanized to the attaching plate 9, will occur. Similarly in the case of the first or main member of the device to which the shock of such impact is in turn transmitted, there will result a gradual flexing of the walls in addition to such compression thereof as may occur. It will be noted that all such flexing has to be taken care of between the two metal restrained areas since the walls adjacent the larger face or base of the member are retained by the ring or band 4 while the portion adjacent the smaller face is similarly retained by the flange 12 on plate 9. Since the distance between these metal restrained areas is quite large for the amount of flexing required, all such flexing is very gradual and no strains are localized at any one point. Accordingly such main member 3 should last indefinitely in service, and while member 7 which takes the brunt of the impact may be expected to wear out in time it may be readily replaced without requiring the whole device to be taken apart or reconstructed.

It should be noted that due to the sealing off of the hollow space within the main member 3 additional resilient action may be obtained by compression of the air confined within such space. If desired, by providing a small hole 13 in the opposed portion of clip 1 provision may be made to relieve such air pressure gradually and at the same time obtain a damping effect.

As a result of the foregoing construction and mode of operation of my device not only will the impact of the shuttle be satisfactorily taken up but tendency to throw the shuttle back is substantially eliminated as is highly desirable since it is necessary to locate the shuttle in the box quite accurately. In other words, a bumper constructed in accordance with my invention will allow the shuttle to be stopped at a very definite point each time that it hits.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a picker bumper for looms, the combination of a main member of resilient compressible material having sloping side walls connected to form a corresponding cavity in the larger face thereof, a rigid attaching element laterally encircling said member adjacent such face, a second member of similar material, solid in cross-section, projecting centrally from and secured to the smaller face of said first member, and a rigid plate interposed between said members, said plate having a flange laterally encircling said first member adjacent the smaller face thereof.

2. In a picker bumper for looms, the combination of a main member of resilient compressible material having sloping side walls connected to form a corresponding cavity in the larger face thereof, a rigid attaching element laterally encircling said member adjacent such face, a second member of similar material and of solid, hour-glass form, projecting centrally from and secured to the smaller face of said first member, a rigid plate forming the base of said second member, and a headed stud on said plate, the smaller face of said first member having an aperture adapted to receive said stud and thereby detachably secure said second member in place thereon.

3. In a picker bumper for looms, the combination of a main member of resilient compressible material having sloping side walls connected to form a corresponding cavity in the larger face thereof, a rigid attaching element laterally encircling said member adjacent such face, a second member of similar material and of solid, hour-glass form, projecting centrally from the smaller face of said first member, a rigid plate forming the base of said second member, and a headed stud on said plate, the smaller face of said first member having an aperture adapted to receive said stud and thereby detachably secure said second member in place thereon and said plate having a flange adapted laterally to encircle said larger member adjacent such smaller face thereof.

4. In a device of the character described, the combination of a support providing a flat surface, a member of resilient compressible material having a cavity formed in one face thereof, a rigid element encircling said member adjacent such face, the latter being formed with a bead normally projecting beyond the lower edge of said element, and means securing the latter to such support face, whereby such bead is compressed so as to seal off such cavity.

5. In a device of the character described, the combination of a support providing a flat surface, a member of resilient compressible material having a cavity formed in one face thereof, a rigid element encircling said member adjacent such face, the latter being formed with a bead normally projecting beyond the lower edge of said element, and means securing the latter to such support face, whereby such bead is compressed so as to seal off such cavity, and a second resilient member projecting from the smaller face of said first member and detachably secured thereto.

6. In a device of the character described, the combination of a support providing a flat surface, a member of resilient compressible material having a cavity formed in one face thereof, a rigid element encircling said member adjacent such face, the latter being formed with a bead normally projecting beyond the lower edge of said element, and means securing the latter to such support face, whereby such bead is compressed so as to seal off such cavity, and a second member of similar material of solid, hour-glass form, projecting centrally from the smaller face of said first member, a rigid plate forming the base of said second member, and a headed stud on said plate, the smaller face of said first member having an aperture adapted to receive said stud and thereby detachably secure said second member in place thereon and said plate having a flange adapted laterally to encircle said larger member adjacent such smaller face thereof.

7. In a picker bumper for looms, the combination of a main member of resilient compressible material having sloping side walls connected to form a large cavity in the larger face thereof, a support in the form of a spring clip having a wide flat surface, a rigid element secured to said clip and encircling the mouth of such cavity with such flat surface of said clip sealing such cavity, such clip having a small opening therethrough for venting such cavity, and a second impact member of material similar to said first member, of solid hour-glass form, one end of which is removably secured to the smaller face of said first member with said impact member projecting centrally therefrom.

CURT SAURER.

REFERENCES CITED

The following references are of record in the file of this patent:

UNITED STATES PATENTS

| Number | Name | Date |
| --- | --- | --- |
| 664,816 | Mills | Dec. 25, 1900 |
| 700,965 | Mills | May 27, 1902 |
| 1,450,726 | Holbrook | Apr. 3, 1923 |
| 2,111,489 | Haupt | Mar. 15, 1938 |
| 2,427,625 | Saurer | Sept. 16, 1947 |

Certificate of Correction

Patent No. 2,491,909                                                December 20, 1949

CURT SAURER

It is hereby certified that the above numbered patent was erroneously issued to "The Ohio Rubber Company, of Willoughby, Ohio, a corporation of Ohio", as assignee, whereas said patent should have been issued to *The Ohio Rubber Company, of Willoughby, Ohio, a corporation of Delaware, assignee by mesne assignments*; and that the said Letters Patent should be read with these corrections therein that the same may conform to the record of the case in the Patent Office.

Signed and Sealed this 4th day of April, A. D. 1950.

[SEAL]

THOMAS F. MURPHY,
*Assistant Commissioner of Patents.*